United States Patent
Luo (10) Patent No.: US 12,379,758 B2
(45) Date of Patent: Aug. 5, 2025

(54) POWER SUPPLY METHOD AND SYSTEM, COMPUTER APPARATUS, AND NON-TRANSITORY STORAGE MEDIUM

(71) Applicant: INSPUR SUZHOU INTELLIGENT TECHNOLOGY CO., LTD., Jiangsu (CN)

(72) Inventor: Siheng Luo, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/246,131

(22) PCT Filed: Sep. 29, 2021

(86) PCT No.: PCT/CN2021/121881
§ 371 (c)(1),
(2) Date: Mar. 21, 2023

(87) PCT Pub. No.: WO2022/127291
PCT Pub. Date: Jun. 23, 2022

(65) Prior Publication Data
US 2023/0367381 A1 Nov. 16, 2023

(30) Foreign Application Priority Data
Dec. 18, 2020 (CN) .......................... 202011504366.4

(51) Int. Cl.
*G06F 1/26* (2006.01)
(52) U.S. Cl.
CPC ...................................... *G06F 1/26* (2013.01)
(58) Field of Classification Search
None
See application file for complete search history.

(56) References Cited

U.S. PATENT DOCUMENTS 9,966,842 B1 * 5/2018 Jiang ....................... G05F 1/565
10,714,929 B2 7/2020 Okajima
(Continued)

FOREIGN PATENT DOCUMENTS

CN 108075662 A 5/2018
CN 109474173 A 3/2019
(Continued)

OTHER PUBLICATIONS

International search report for PCT/CN2021/121881 mailed on Dec. 23, 2021.

*Primary Examiner* — Fahmida Rahman
(74) *Attorney, Agent, or Firm* — Dennemeyer & Associates LLC (57) ABSTRACT

Disclosed are a power supply method and system, a computer apparatus and a non-transitory storage medium. The method includes: inputting an initial input voltage into a voltage regulator and a voltage conversion circuit (S1); converting the initial input voltage into a logic control voltage by means of the voltage regulator (S2); enabling a logic control unit by using the logic control voltage, to make the logic control unit generate a first control signal (S3); converting the initial input voltage into a voltage with a preset magnitude by the voltage conversion circuit on the basis of the first control signal, to supply power to a load (S4); and inputting the voltage with the preset magnitude into the voltage regulator, to make the voltage regulator convert the voltage with the preset magnitude into the logic control voltage (S5).

15 Claims, 4 Drawing Sheets

(56) References Cited

U.S. PATENT DOCUMENTS

| | | | | |
|---|---|---|---|---|
| 2012/0062752 A1* | 3/2012 | Hsieh | .................... | H04N 25/709 |
| | | | | 348/207.1 |
| 2015/0381040 A1* | 12/2015 | Uan-Zo-Li | .......... | H02M 3/1584 |
| | | | | 323/271 |
| 2019/0081549 A1* | 3/2019 | Lee | ....................... | H02M 1/088 |

FOREIGN PATENT DOCUMENTS

| CN | 111835199 A | 10/2020 |
|---|---|---|
| CN | 112612356 A | 4/2021 |

\* cited by examiner

POWER SUPPLY METHOD AND SYSTEM, COMPUTER APPARATUS, AND NON-TRANSITORY STORAGE MEDIUM

CROSS-REFERENCE TO RELATED APPLICATIONS

This is a 35 U.S.C. 371 National Stage Patent Application of International Application No. PCT/CN2021/121881, filed Sep. 29, 2021, which claims priority to Chinese application 202011504366.4, filed Dec. 18, 2020, each of which is hereby incorporated by reference in its entirety.

TECHNICAL FIELD

The disclosure relates to the field of power supply, and particularly relates to a power supply method and system, a computer apparatus, and a non-transitory storage medium.

BACKGROUND

As power consumption of a server system increases and a higher computability of the system is required, a central processing unit (CPU) and a memory with a higher data processing capability are needed, and corresponding power consumption of the CPU and the memory also increases dramatically. A traditional system generally supplies power input at 12 V, and then 12 V is converted into a core voltage required by the CPU and the memory. In this process, the loss of 12 V in a main printed circuit board (PCB)± is huge. As a result, a high-voltage direct current power supply solution has been proposed in the industry, which upgrades a 12 V input solution to a 54 V direct current input solution. In this way, under the condition of the same load power, the loss of the main PCB± in the 54 V input solution can be reduced to 0.05 times of that in the 12 V input solution.

On the basis of 54 V input, since some peripheral component interface express (PCIE) daughter cards and hard disks on a main board of a server still need 12 V, a voltage regulation (VR) solution of converting 54 V into 12 V is required. Since a logic function unit in such a VR chip requires a power supply voltage of 5 V to maintain the chip working normally, a 54 V to 5 V low dropout regulator (LDO) is used in the chip to maintain normal work after power-on operation. However, for the on-chip 54 V to 5 V LDO solution, a loss on the LDO is 49 mw according to a chip static load current of 1 mA. If the chip continues being powered according to the LDO solution, 49 mw of power will continuously be consumed in the chip. It will not only increase the power consumption, but also increase a chip junction temperature, which will affect heat dissipation and working reliability of the chip.

SUMMARY

Embodiments of the disclosure provide a power supply method, includes:
 an initial input voltage is input into a voltage regulator and a voltage conversion circuit;
 the initial input voltage is converted into a logic control voltage by means of the voltage regulator;
 a logic control unit is enabled by using the logic control voltage to make the logic control unit generate a first control signal;
 the initial input voltage is converted into a voltage with a preset magnitude by the voltage conversion circuit on the basis of the first control signal to supply power to a load; and
 the voltage with the preset magnitude is input into the voltage regulator to make the voltage regulator convert the voltage with the preset magnitude into the logic control voltage.

In some embodiments, the voltage with a preset magnitude is input into the voltage regulator, includes:
 the logic control unit is enabled by using the voltage with the preset magnitude, to make the logic control unit generate a second control signal; and
 the voltage regulator is made to receive the voltage with the preset magnitude by means of the second control signal.

In some embodiments, the method further includes:
 the initial input voltage, the voltage with a preset magnitude and the second control signal are received by using a power supply switching unit;
 the voltage with the preset magnitude is input into the voltage regulator in response to the power supply switching unit receiving the second control signal; and
 the initial input voltage is input into the voltage regulator in response to the power supply switching unit not receiving the second control signal.

In some embodiments, the initial input voltage is converted into the logic control voltage by means of the voltage regulator further includes:
 the initial input voltage is converted into the logic control voltage in response to the voltage regulator receiving an enable signal.

Based on the same application concept, according to another aspect of the disclosure, embodiments of the disclosure further provide a power supply system, includes:
 a power supply component, where the power supply component is configured to input an initial input voltage into a voltage regulator and a voltage conversion circuit;
 a voltage regulator component, where the voltage regulator component is configured to convert the initial input voltage into a logic control voltage by means of the voltage regulator;
 an enable component, where the enable component is configured to enable a logic control unit by using the logic control voltage, to make the logic control unit generate a first control signal;
 a conversion component, where the conversion component is configured to convert the initial input voltage into a voltage with a preset magnitude by the voltage conversion circuit on the basis of the first control signal, to supply power to a load; and
 a feedback component, where the feedback component is configured to input the voltage with the preset magnitude into the voltage regulator, to make the voltage regulator convert the voltage with the preset magnitude into the logic control voltage.

In some embodiments, the system further includes a control component, wherein the control component is configured to:
 enable the logic control unit by using the voltage with the preset magnitude, to make the logic control unit generate a second control signal; and
 make the voltage regulator receive the voltage with the preset magnitude by means of the second control signal.

In some embodiments, the power supply component is further configured to:
 receive the initial input voltage, the voltage with the preset magnitude and the second control signal by using a power supply switching unit;

input the voltage with the preset magnitude into the voltage regulator in response to the power supply switching unit receiving the second control signal; and input the initial input voltage into the voltage regulator in response to the power supply switching unit not receiving the second control signal.

In some embodiments, the voltage regulator component is further configured to:

convert the initial input voltage into the logic control voltage in response to the voltage regulator receiving an enable signal.

Based on the same application concept, according to another aspect of the disclosure, embodiments of the disclosure further provide a computer apparatus, includes:

at least one processor; and a memory storing a computer program executable on the processor, where the processor executes the steps of the above power supply method when executing the program.

Based on the same application concept, according to another aspect of the disclosure, embodiments of the disclosure further provide a non-transitory storage medium, storing a computer program, where the computer program executes the steps of any one of the above power supply methods when executed by a processor.

BRIEF DESCRIPTION OF THE DRAWINGS

In order to more clearly illustrate technical solutions in the embodiments of the disclosure or in the prior art, a brief introduction to the accompanying drawings required for the description of the embodiments or the prior art will be provided below. Obviously, the accompanying drawings in the following description are only some of the embodiments of the disclosure, and those of ordinary skill in the art would also be able to derive other embodiments from these drawings without making creative efforts.

DETAILED DESCRIPTION OF THE EMBODIMENTS

In order to make the objectives, technical solutions and advantages of the disclosure clearer, the embodiments of the disclosure will be described in further detail below in conjunction with particular embodiments with reference to the accompanying drawings.

It is to be noted that all expressions using "first" and "second" in the embodiments of the disclosure are intended to distinguish two different entities or different parameters with the same name. It can be seen that "first" and "second" are merely for the convenience of expressions and should not be construed as limiting the embodiments of the disclosure, and will not be explained in the subsequent embodiments.

In an embodiment of the disclosure, the voltage regulator is a low dropout regulator (LDO) in a voltage regulation (VR) chip.

Figure 1:
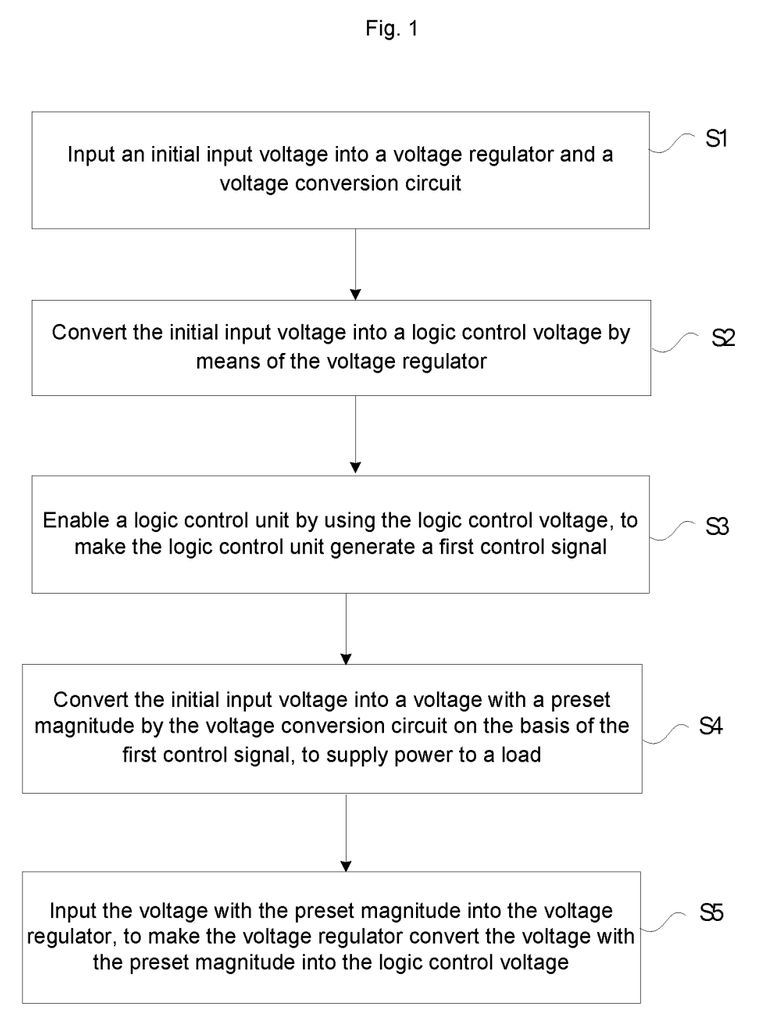
FIG. 1 is a schematic flowchart of a power supply method according to an embodiment of the disclosure.

According to one aspect of the disclosure, embodiments of the disclosure provide a power supply method. As shown in FIG. 1, the method may include:

S1, an initial input voltage is input into a voltage regulator and a voltage conversion circuit;

S2, the initial input voltage is converted into a logic control voltage by means of the voltage regulator;

S3, a logic control unit is enabled by using the logic control voltage, to make the logic control unit generate a first control signal;

S4, the initial input voltage is converted into a voltage with a preset magnitude by the voltage conversion circuit on the basis of the first control signal, to supply power to a load; and S5, the voltage with the preset magnitude is input into the voltage regulator, to make the voltage regulator convert the voltage with the preset magnitude into the logic control voltage.

The solution provided in the disclosure may solve the problem that when a server system continuously supplies power to a load, a great loss is caused since a low dropout regulator (LDO) is used in a VR chip to directly convert 54 V into 5 V to continuously supply power to an internal function unit.

Figure 2:
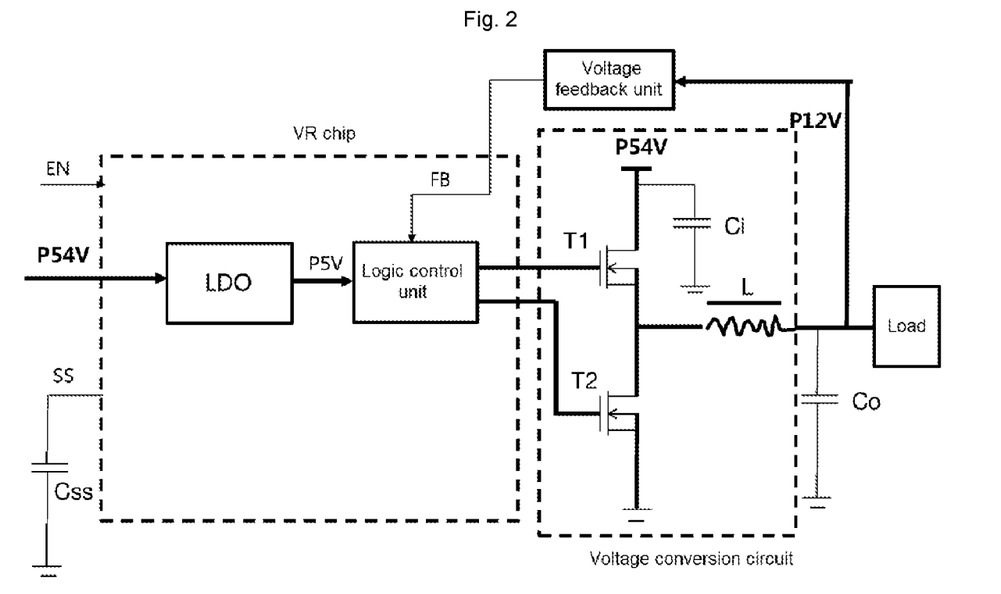
FIG. 2 is a schematic diagram of a power supply circuit according to an embodiment of the disclosure.

In some embodiments, as shown in FIG. 2, when a 54V direct current voltage is directly input into the VR chip, P54V is converted into P5V by means of an internal LDO of the chip, so as to supply power to a logic control unit in the VR chip and ensure normal working of the chip. Then, after an enable (EN) signal becomes valid, the chip enters a soft start process, a logic control part generates a pulse-width modulation (PWM) signal to control switch transistors T1 and T2 to conduct alternately, after output inductor L and capacitor Co filtering, the output voltage P12V is established, and VR closed-loop compensation control is achieved by means of a voltage feedback unit to implement stable output. P54V is used as power supply input of the VR chip and an input voltage of switch conversion. The logic control unit contains functions of over-current protection, over-voltage protection and PWM generator in the VR chip. A VR chip pin SS is used to adjust a setting time of the output voltage by adjusting a capacitance value of the capacitor Css. The voltage feedback unit contains a voltage feedback compensation network, to implement VR closed-loop compensation control.

In some embodiments, the step of converting the initial input voltage into a logic control voltage by means of the voltage regulator further includes:

the initial input voltage is converted into the logic control voltage in response to the voltage regulator receiving an enable signal.

In some embodiments, the step of inputting the voltage with a preset magnitude into the voltage regulator includes:

the logic control unit is enabled by using the voltage with the preset magnitude, to make the logic control unit generate a second control signal; and the voltage regulator is made to receive the voltage with the preset magnitude by means of the second control signal.

Specifically, as shown in FIG. 2, when the initial input voltage (for instance, P54V) is converted into a voltage with a preset magnitude (for instance, P12V) by means of the first control signal to supply power to the load, the voltage with a preset magnitude is fed back to the logic control unit by means of the voltage feedback unit, and the logic control unit may generate a high-level second control signal (powergood (PG) signal) under the voltage, and then make the voltage regulator receive the voltage with a preset magnitude by means of the high-level second control signal, that is, instead of continuing to work at the initial input voltage (for instance, P54V), the voltage regulator works at the voltage with a preset magnitude (for instance, P12V).

Since the initial input voltage is greater than the voltage with a preset magnitude, after P12V is connected, the LDO implements conversion of P12V into P5V, and under the condition that a load current of the logic control unit of the VR chip is 1 mA, a loss generated by the LDO conversion is (12−5) v*1 mA=7 mW. When the LDO implements conversion of P54V to P5V, under the same load current condition, a loss generated by the LDO conversion is (54−5)v*1 mA=49 mW. With the solution of the disclosure, it may be achieved that a chip LDO loss is greatly reduced, thereby reducing chip power consumption and improving heat dissipation.

In some embodiments, the method further includes:
the initial input voltage, the voltage with a preset magnitude and the second control signal are received by using a power supply switching unit;
the voltage with the preset magnitude is input into the voltage regulator in response to the power supply switching unit receiving the second control signal; and
the initial input voltage is input into the voltage regulator in response to the power supply switching unit not receiving the second control signal.

Specifically, as shown in FIG. 2, the initial input voltage, the voltage with a preset magnitude and the second control signal may be received by using a power supply switching unit. Before the output voltage with a preset magnitude is established by the power supply switching unit, the initial input voltage is directly input into the VR chip, and the voltage with a preset magnitude output from the VR chip is used as the LDO input voltage by means of the power supply switching unit in the chip. When the enable signal of the VR chip becomes valid, the chip enters a soft start process. In this case, the power supply switching unit is connected to the initial input voltage as LDO input, and the logic control unit generates a first control signal (PWM signal) to control the switch transistors T1 and T2 of the voltage conversion circuit to alternately conduct, to output the voltage with a preset magnitude by means of LC filtering. After the soft start is finished, an output voltage with a preset magnitude is established, and the logic control unit generates the high-level second control signal (PG signal). In this case, the PG signal controls the power supply switching unit to be connected to the output voltage of the preset magnitude as the LDO input.

Figure 3:
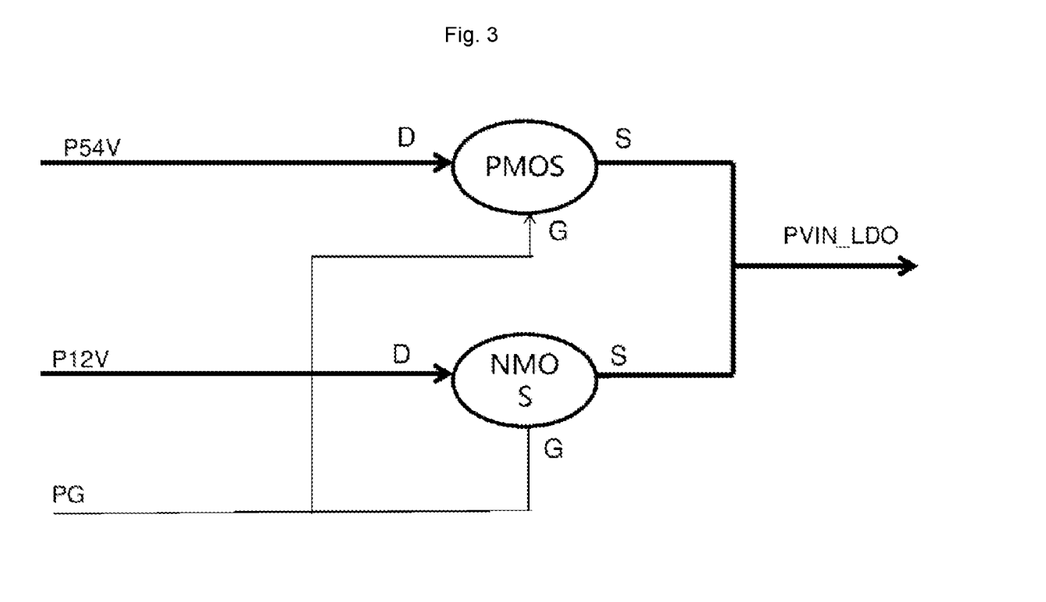
FIG. 3 is a circuit diagram of a power supply switching unit according to an embodiment of the disclosure.

In some embodiments, a structure of the power supply switching unit may be as shown in FIG. 3. When the PG signal is at a low level, a P-channel metal oxide semiconductor (PMOS) is turned on, and an N-channel metal oxide semiconductor (NMOS) is turned off, and in this case, the initial input voltage is connected and output to a power input low dropout regulator (PVIN_LDO) to serve as the LDO input voltage. When the PG signal is at a high level, the NMOS is turned on, and the PMOS is turned off, and in this case, the voltage with a preset magnitude is connected and output to the PVIN_LDO as the LDO input voltage.

In some embodiments, according to the circuit as shown in FIG. 2, a VR switching frequency Fsw is set according to a VR supply voltage (for instance, 12 V) and a maximum load current value Imax, and appropriate specifications of the switch transistors T1, T2 and the filter capacitors Cin, co and the filter inductor L are selected according to the set Fsw to build a P54V to P12V line. Then the P12V is fed back to the VR chip pin in two paths, where the first path is connected to the VR chip feedback pin by means of a VR line feedback unit, and the second path is directly connected to the power supply switching unit in the VR chip. A power supply switching unit may be added in the VR chip, the switching unit structure is as shown in FIG. 3, corresponding PMOS and NMOS are made, a PG signal of a logic control part in the VR chip is connected to Gates of the PMOS and NMOS of the switching unit, and an initial power supply pin is connected to a Drain of the PMOS. The voltage with a preset magnitude output by the VR line feedback unit is connected to a D pin of the NMOS. Sources of the PMOS and the NMOS are merged together. Finally, the PVIN_LDO is transferred out as the LDO input in the VR chip by means of the power supply switching unit, and the PVIN_LDO transfers P5V out by means of the LDO to supply power to the logic function part in the VR chip.

The solution provided in the disclosure introduces an LDO power supply input voltage switching mechanism, to implement switching control of P54V and P12V by means of the PG signal of the VR chip. P54V is used as LDO input to transfers P5V out before the VR chip output voltage is established, and P12V is used as LDO input to transfer P5V out after the VR chip output voltage is established. In this way, the problem that when a server system continuously supplies power to a load, a great loss is caused since the LDO is used in the chip to directly convert 54 V into 5 V to continuously supply power to an internal function unit is solved.

Figure 4:
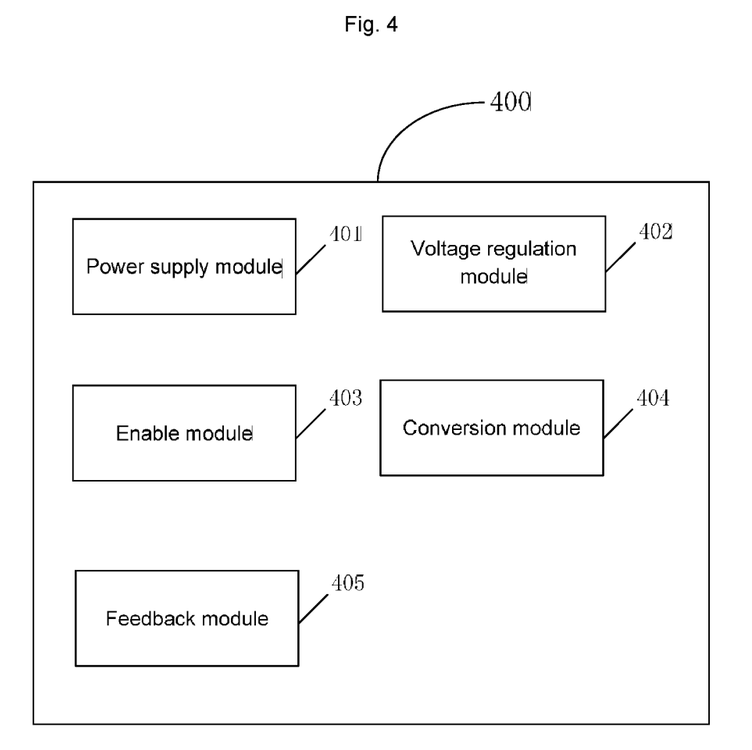
FIG. 4 is a schematic structural diagram of a power supply system according to an embodiment of the disclosure.

Based on the same application concept, according to another aspect of the disclosure, embodiments of the disclosure further provide a power supply system 400. As shown in FIG. 4, the system includes:
a power supply component 401, where the power supply component 401 is configured to input an initial input voltage into a voltage regulator and a voltage conversion circuit;
a voltage regulator component 402, where the voltage regulator component 402 is configured to convert the initial input voltage into a logic control voltage by means of the voltage regulator;
an enable component 403, where the enable component 403 is configured to enable a logic control unit by using the logic control voltage, to make the logic control unit generate a first control signal;
a conversion component 404, where the conversion component 404 is configured to convert the initial input voltage into a voltage with a preset magnitude by the voltage conversion circuit on the basis of the first control signal, to supply power to a load; and
a feedback component 405, where the feedback component 405 is configured to input the voltage with the preset magnitude into the voltage regulator, to make the voltage regulator convert the voltage with the preset magnitude into the logic control voltage.

In some embodiments, the system further includes a control component, wherein the control component is configured to:
enable the logic control unit by using the voltage with the preset magnitude, to make the logic control unit generate a second control signal; and
make the voltage regulator receive the voltage with the preset magnitude by means of the second control signal.

In some embodiments, the power supply component is further configured to:
  receive the initial input voltage, the voltage with the preset magnitude and the second control signal by using a power supply switching unit;
  input the voltage with the preset magnitude into the voltage regulator in response to the power supply switching unit receiving the second control signal; and
  input the initial input voltage into the voltage regulator in response to the power supply switching unit not receiving the second control signal.

In some embodiments, the voltage regulator component is further configured to:
  convert the initial input voltage into the logic control voltage in response to the voltage regulator receiving an enable signal.

Figure 5:
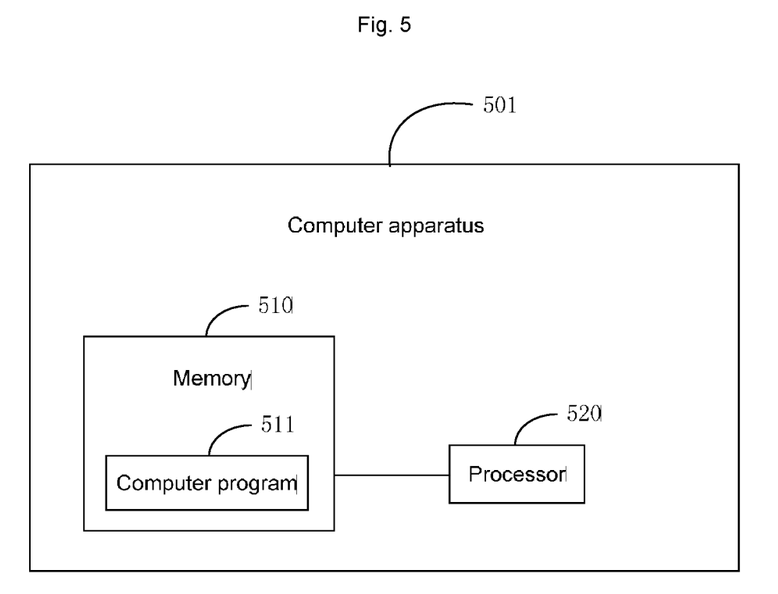
FIG. 5 is a schematic structural diagram of a computer apparatus according to an embodiment of the disclosure.

Based on the same application concept, according to another aspect of the disclosure, as shown in FIG. 5, embodiments of the disclosure further provides a computer apparatus 501, including:
  at least one processor 520; and
  a memory 510, where the memory 510 stores a computer program 511 executable on the processor, and the processor 520 executes the steps of the above power supply method when executing the program.

Figure 6:
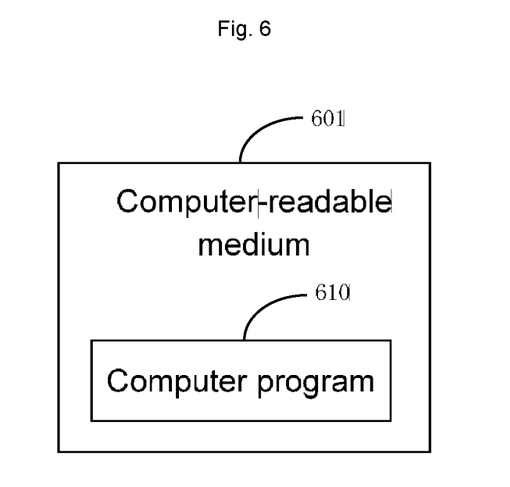
FIG. 6 is a schematic structural diagram of a non-transitory storage medium according to an embodiment of the disclosure.

Based on the same application concept, according to another aspect of the disclosure, as shown in FIG. 6, embodiments of the disclosure further provides a non-transitory storage medium 601, where the non-transitory storage medium 601 stores a computer program instruction 610, the computer program instruction 610 executes the steps of any one of the above power supply methods when executed by a processor.

Finally, it is to be noted that those of ordinary skill in the art can understand that all or some procedures in the method in the embodiment may be implemented by a computer program instructing related hardware. The program may be stored in one non-transitory storage medium, and the program can include the processes in embodiments of the method above when executed.

Moreover, it should be appreciated that the non-transitory storage medium (for instance, memory) herein can be a volatile memory or a nonvolatile memory, or can include both the volatile memory and the nonvolatile memory.

Those skilled in the art will further appreciate that the various illustrative logical blocks, components, circuits, and algorithm steps described in connection with the disclosure herein can be implemented as electronic hardware, computer software, or a combination of both. To clearly illustrate interchangeability of hardware and software, various illustrative components, blocks, components, circuits, and steps have been described generally in terms of their functions. Whether such functions are implemented as software or hardware depends upon the particular application and design constraints imposed on the overall system. Those skilled in the art can implement the described function in varying ways for each particular application, but such implementation decisions should not be interpreted as causing a departure from the disclosed scope of the embodiments of the disclosure.

What are described above are illustrative embodiments disclosed in the disclosure, but it should be noted that various changes and modifications can be made without departing from the disclosed scope of the embodiments of the disclosure as defined by the appended claims. The functions, steps, and/or actions of the method claims in the disclosed embodiments described herein need not be performed in any particular order. Furthermore, although elements disclosed in the embodiments of the disclosure can be described or claimed in the singular, they can further be construed as a plural unless specifically limited to the singular.

It is to be understood that as used herein, the singular forms "a" and "an" are intended to include the plural forms as well, unless exceptional cases are clearly supported by the context. It is further to be understood that the term "and/or" as used herein refers to including any or all possible combinations of one or more of the associated listed items.

The disclosed embodiment serial numbers of the embodiments of the disclosure are merely used for description and do not represent the merits of the embodiments.

Those of ordinary skill in the art will appreciate that all or some of the steps for implementing the above embodiments can be performed by hardware or by a program instructing associated hardware. The program can be stored on a non-transitory storage medium, for instance, a read-only memory, a magnetic disk, or a optical disk, etc.

Those of ordinary skill in the art will understand that the discussion of any embodiment above is merely illustrative, and is not intended to imply that the disclosed scope (including the claims) of the embodiments of the disclosure is limited to these instances. The technical features in the above embodiments or in different embodiments can further be combined within a framework of the embodiments of the disclosure. Many other variations of the different aspects of the embodiments of the disclosure as described above exist, and they are not provided in detail for the sake of brevity. Therefore, any omission, modifications, equivalent substitutions, improvements, etc. within the spirit and principles of the embodiments of the disclosure are intended to fall within the scope of protection of the embodiments of the disclosure.

The invention claimed is:

1. A power supply method, comprising:
  inputting an initial input voltage into a voltage regulator (VR) and a voltage conversion circuit;
  converting the initial input voltage into a logic control voltage by means of the voltage regulator;
  enabling a logic control unit by using the logic control voltage, to make the logic control unit generate a first control signal;
  converting the initial input voltage into a voltage with a preset magnitude by the voltage conversion circuit on the basis of the first control signal, to supply power to a load; and
  inputting the voltage with the preset magnitude into the voltage regulator, to make the voltage regulator convert the voltage with the preset magnitude into the logic control voltage,
  the method further comprising:
  receiving the initial input voltage and the voltage with the preset magnitude by using a power supply switching unit;
  inputting the voltage with the preset magnitude into the voltage regulator in a case that the power supply switching unit further receives a second control signal; and
  inputting the initial input voltage into the voltage regulator in a case that the power supply switching unit does not receive the second control signal,
  wherein, inputting the voltage with the preset magnitude into the voltage regulator in response to the power supply switching unit further receiving the second control signal, comprises:

after a soft start being finished, establishing an output voltage of the preset magnitude, and generating the second control signal with a high level by the logic control unit, and controlling the power supply switching unit by the second control signal to be connected to the output voltage of the preset magnitude as an input of a low dropout regulator (LDO), wherein, controlling the power supply switching unit by the second control signal to be connected to the output voltage of the preset magnitude as the input of the LDO, comprises:

when the second control signal being at a low level, turning on a P-channel metal oxide semiconductor (PMOS) of the power supply switching unit, and turning off an N-channel metal oxide semiconductor (NMOS) of the power supply switching unit, and connecting the initial input voltage with a power input low dropout regulator (PVIN_LDO) for outputting as an input voltage of the LDO, the method further comprising:

setting a switching frequency of the VR (Fsw) according to a supply voltage of the VR and a maximum load current value (Imax);

selecting a switch transistor (T1), a switch transistor (T2) and filter capacitors and a filter inductor according to the VR switching frequency (Fsw) to build a 54V line to a 12V line, wherein, inputting the initial input voltage into the voltage regulator in response to the power supply switching until not receiving the second control signal, comprises:

when an enable signal of a voltage regulation chip becoming valid, the chip entering a soft start process, and the power supply switching until being connected to the initial input voltage as an input of the LDO, and generating the first control signal by the logic control unit to control the switch transistor (T1) and the switch transistor (T2) of the voltage conversion circuit to alternately conduct, to output the voltage with the preset magnitude by means of inductor (L)-capacitor (Ci) filtering, wherein the voltage regulator is the LDO in the voltage regulation chip.

2. The method according to claim 1, wherein inputting the voltage with the preset magnitude into the voltage regulator comprises:

enabling the logic control unit by using the voltage with the preset magnitude, to make the logic control unit generate the second control signal; and making the voltage regulator receive the voltage with the preset magnitude by means of the second control signal.

3. The method according to claim 2, wherein, enabling the logic control unit by using the voltage with the preset magnitude, to make the logic control unit generate the second control signal, and making the voltage regulator receive the voltage with the preset magnitude by means of the second control signal, comprises:

when the initial input voltage being converted into the voltage with the preset magnitude by means of the first control signal to supply power to the load, feeding back the voltage with the preset magnitude to the logic control unit by means of a voltage feedback unit, and generating a high-level second control signal by the logic control unit under the voltage with the preset magnitude, and then making the voltage regulator to receive the voltage with the preset magnitude by means of the high-level second control signal.

4. The method as claimed in claim 1, wherein converting the initial input voltage into the logic control voltage by means of the voltage regulator further comprises:

converting the initial input voltage into the logic control voltage in response to the voltage regulator receiving the enable signal.

5. The method according to claim 1, wherein, controlling the power supply switching unit by the second control signal to be connected to the output voltage of the preset magnitude as the input of the LDO, further comprises:

when the second control signal being at the high level, turning on the NMOS, and turning off the PMOS, and connecting the voltage with the preset magnitude for outputting to the PVIN_LDO as the input voltage of the LDO.

6. The method according to claim 1, wherein, the initial input voltage is 54V, the voltage with the preset magnitude is 12V, and the logic control voltage is 5V.

7. The method according to claim 1, further comprising:

feeding back the 12V line to pins of the voltage regulation chip in two paths, wherein a first path of the two paths is connected to a feedback pin of the voltage regulation chip by means of a VR line feedback unit, and a second path of the two paths is directly connected to the power supply switching unit in the voltage regulation chip.

8. The method according to claim 7, further comprising:

adding the power supply switching unit in the voltage regulation chip, and making corresponding PMOS and NMOS, wherein, the second control signal of a logic control part in the voltage regulation chip is connected to Gates of the PMOS of the switching unit and Gates of the NMOS of the switching unit, and an initial power supply pin is connected to a Drain of the PMOS, the voltage with the preset magnitude output by the VR line feedback unit is connected to a D pin of the NMOS, Sources of the PMOS and the NMOS are merged together.

9. The method according to claim 8, further comprising:

transferring the PVIN_LDO out as the input of the LDO in the voltage regulation chip by means of the power supply switching unit, wherein the PVIN_LDO transfers a 5V line out by means of the LDO to supply power to a logic function part in the voltage regulation chip.

10. The method according to claim 1, wherein, enabling a logic control unit by using the logic control voltage, to make the logic control unit generate a first control signal, and converting the initial input voltage into a voltage with a preset magnitude by the voltage conversion circuit on the basis of the first control signal, to supply power to a load, comprises:

after the enable signal becoming valid, the voltage regulation chip enters the soft start process, generating a pulse-width modulation signal by a logic control part of the logic control unit, to control the switch transistor (T1) and the switch transistor (T2) to conduct alternately, after output inductor (L) and capacitor (Co) filtering, an output voltage (P12V) being established.

11. The method according to claim 10, wherein the logic control unit comprises functions of over-current protection, over-voltage protection and pulse-width modulation (PWM) generator in the voltage regulation chip.

12. The method according to claim 10, further comprising:

by using a voltage feedback unit to achieve a VR closed-loop compensation control.

13. The method according to claim 12, wherein the voltage feedback unit contains a voltage feedback compensation network, which is configured to implement the VR closed-loop compensation control.

14. A computer apparatus, comprising:
   at least one processor; and
   a memory storing a computer program executable on the processor, wherein the computer program, when being executed by the at least one processor, cause the at least one processor to:
   input an initial input voltage into a voltage regulator (VR) and a voltage conversion circuit;
   convert the initial input voltage into a logic control voltage by means of the voltage regulator;
   enable a logic control unit by using the logic control voltage, to make the logic control unit generate a first control signal;
   convert the initial input voltage into a voltage with a preset magnitude by the voltage conversion circuit on the basis of the first control signal, to supply power to a load; and
   input the voltage with the preset magnitude into the voltage regulator, to make the voltage regulator convert the voltage with the preset magnitude into the logic control voltage,
   the computer program, when being executed by the at least one processor, further cause the at least one processor to:
   receive the initial input voltage and the voltage with the preset magnitude by using a power supply switching unit;
   input the voltage with the preset magnitude into the voltage regulator in a case that the power supply switching unit further receive the second control signal; and
   input the initial input voltage into the voltage regulator in a case that the power supply switching unit does not receive the second control signal,
   wherein, inputting the voltage with the preset magnitude into the voltage regulator in response to the power supply switching unit further receiving the second control signal, comprises:
   after a soft start being finished, establishing an output voltage of the preset magnitude, and generating the second control signal with a high level by the logic control unit, and controlling the power supply switching unit by the second control signal to be connected to the output voltage of the preset magnitude as an input of a low dropout regulator (LDO),
   wherein, controlling the power supply switching unit by the second control signal to be connected to the output voltage of the preset magnitude as the input of the LDO, comprises:
   when the second control signal being at a low level, turning on a P-channel metal oxide semiconductor (PMOS) of the power supply switching unit, and turning off an N-channel metal oxide semiconductor (NMOS) of the power supply switching unit, and connecting the initial input voltage with a power input low dropout regulator (PVIN_LDO) for outputting as an input voltage of the LDO,
   the computer program, when being executed by the at least one processor, further cause the at least one processor to:
   set a switching frequency of the VR (Fsw) according to a VR-supply voltage of the VR and a maximum load current value (Imax);
   select a switch transistor (T1), a switch transistor (T2), filter capacitors and a filter inductor according to the VR switching frequency (Fsw) to build a 54V line to a 12V line,
   wherein, inputting the initial input voltage into the voltage regulator in response to the power supply switching unit not receiving the second control signal, comprises:
   when the enable signal of a voltage regulation chip becoming valid, the chip entering a soft start process, and the power supply switching unit being connected to the initial input voltage as an input of the LDO, and generation the frit control signal by the logic control unit to control the switch transistor (T1) and the switch transistor (T2) of the voltage conversion circuit to alternately conduct, to output the voltage with the preset magnitude by means of inductor (L)-capictor (Ci) filtering, wherien the voltage regulator is the LDO in the voltage regulation chip.

15. A non-transitory storage medium, storing a computer program, wherein when the computer program is executed by a processor, the computer program is configured to cause the at least one processor to:
   input an initial input voltage into a voltage regulator (VR) and a voltage conversion circuit;
   convert the initial input voltage into a logic control voltage by means of the voltage regulator;
   enable a logic control unit by using the logic control voltage, to make the logic control unit generate a first control signal;
   convert the initial input voltage into a voltage with a preset magnitude by the voltage conversion circuit on the basis of the first control signal, to supply power to a load; and
   input the voltage with the preset magnitude into the voltage regulator, to make the voltage regulator convert the voltage with the preset magnitude into the logic control voltage,
   the computer program is further configured to cause the at least one processor to:
   receive the initial input voltage and the voltage with the preset magnitude by using a power supply switching unit;
   input the voltage with the preset magnitude into the voltage regulator in a case that the power supply switching unit further receive the second control signal; and
   input the initial input voltage into the voltage regulator in a case that the power supply switching unit does not receive the second control signal,
   wherein, inputting the voltage with the preset magnitude into the voltage regulator in response to the power supply switching unit further receiving the second control signal, comprises:
   after a soft start being finished, establishing an output voltage of the preset magnitude, and generating the second control signal with a high level by the logic control unit, and controlling the power supply switching unit by the second control signal to be connected to the output voltage of the preset magnitude as an input of a low dropout regulator (LDO),
   wherein, controlling the power supply switching unit by the second control signal to be connected to the output voltage of the preset magnitude as the input of the LDO, comprises:
   when the second control signal being at a low level, turning on a P-channel metal oxide semiconductor (PMOS) of the power supply switching unit, and turning off an N-channel metal oxide semiconductor (NMOS) of the power supply switching unit, and connecting the initial input voltage with a power input low dropout regulator (PVIN_LDO) for outputting as an input voltage of the LDO, the computer program is further configured to cause the at least one processor to:

set a switching frequency of the VR (Fsw) according to a supply voltage of the VR and a maximum load current value (Imax);

select a switch transistor (T1), a switch transistor (T2), filter capacitors and a filter inductor according to the VR switching frequency (Fsw) to build a 54V line to a 12V line, wherein, inputting the initial input voltage into the voltage regulator in response to the power supply switching unit not receiving the second control signal, comprises:

when an enable signal of a voltage regulation chip becoming valid, the chip entering a soft start process, and the power supply switching unit being connected to the initial input voltage as an input of the LDO, and generating the first control signal by the logic control unit to control the switch transistor (T1) and the switch transistor (T2) of the voltage conversion circuit to alternately conduct, to output the voltage with the preset magnitude by means of inductor (L)-capacitor (Ci) filtering, wherein the voltage regulator is the LDO in the voltage regulation chip.

* * * * *